Figure 1:
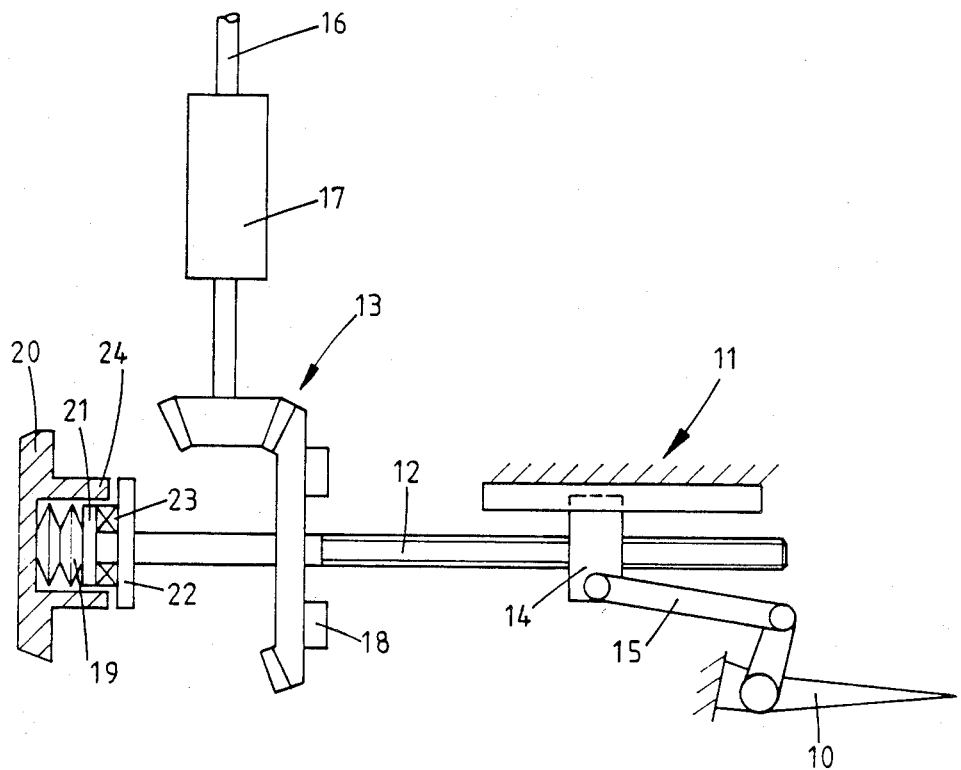

United States Patent [19]

Capewell

[11] Patent Number: 4,864,882

[45] Date of Patent: Sep. 12, 1989

[54] TORQUE LIMITING ARRANGEMENT

[75] Inventor: Terence J. Capewell, Wheaton Aston, United Kingdom

[73] Assignee: Lucas Industries Public Limited Company, Birmingham, England

[21] Appl. No.: 198,407

[22] Filed: May 25, 1988

[30] Foreign Application Priority Data

Jun. 20, 1987 [GB] United Kingdom ............... 8714495

[51] Int. Cl.⁴ ............................................. F16D 67/00
[52] U.S. Cl. .................................. 74/411.5; 192/141
[58] Field of Search ............ 74/411.5, 424.8 R, 89.15; 192/141, 143, 144, 8 R, 7

[56] References Cited

U.S. PATENT DOCUMENTS

| | | | |
|---|---|---|---|
| 3,700,085 | 10/1972 | Balz | 192/141 |
| 3,774,737 | 11/1973 | Anderson | 192/144 X |
| 4,023,430 | 5/1977 | Imamura | 192/143 X |
| 4,064,981 | 12/1977 | House et al. | 192/141 |
| 4,466,511 | 8/1984 | Garnett | 192/141 X |
| 4,613,023 | 9/1986 | Fairbairn et al. | 192/8 R |
| 4,625,843 | 12/1986 | Maltby et al. | 192/8 R |
| 4,751,988 | 6/1988 | Metcalf | 192/141 X |

*Primary Examiner*—Peter A. Aschenbrenner
*Attorney, Agent, or Firm*—Michael F. Petock

[57] ABSTRACT

A rotary to linear converter has a rotary input shaft and a linearly movable output element. A torque limiter arrests rotation of the shaft at a critical value of torque thereon. A friction device increase the torque on the shaft if a predetermined axial force on the output element is exceeded, this torque increase being sufficient to operate the limiter. The arrangement renders operation of the torque limiter directly responsive to axial force on the output element.

3 Claims, 2 Drawing Sheets

TORQUE LIMITING ARRANGEMENT

Air flow control surfaces on aircraft wings are commonly actuated by rotary transmissions which extend along the wings from a central prime mover and communicate by way of gear arrangements with rotary-to-linear converter devices whose outputs are coupled to the control surfaces. The structures of the control surfaces and their mountings on the wings are necessarily light, and the torque available from the prime mover is generally sufficiently large as to be able to cause damage to the control surfaces or to the wings in the event of jamming of the surfaces or of the converter devices.

It is known to provide torque limiting devices which apply a brake to the rotary transmission in the event that a torque level on the transmission in exceeded. It is a disadvantage of known systems that the torque limiting brake devices are sensitive to changes in efficiencies of the gear arrangements and of the rotary-to-linear converters as a result of contamination by dirt or ice, as well as to friction losses in bearings of the system. Additionally the torque load on the transmission may vary as a result of change of alignment of the elements of an output linkage as a control surface is moved between its operating positions. If the brake device is set to operate at a critical torque level existing when components of the system as a whole are operating at their higher efficiencies, the margin between the critical torque level and the total torque at normal operation and low efficiency may be very small, or non-existent, so that unwarranted operation of the brake may occur. If, however, the brake is set to operate at a torque limit associated with a lower efficiency, operation of the system at a higher efficiency may result in damage occuring before the braking level is reached.

It is an object of the invention to provide an arrangement for limiting torque in which the foregoing disadvantages are overcome.

According to the invention there is provided an arrangement for limiting input torque to a rotary-to-linear converter having an input shaft and an output element, said arrangement comprising a braking device for arresting rotation of said input shaft when a torque load thereon exceeds a predetermined value, and a friction device responsive to a predetermined linear force on said output element for increasing said torque load.

Figure 2:
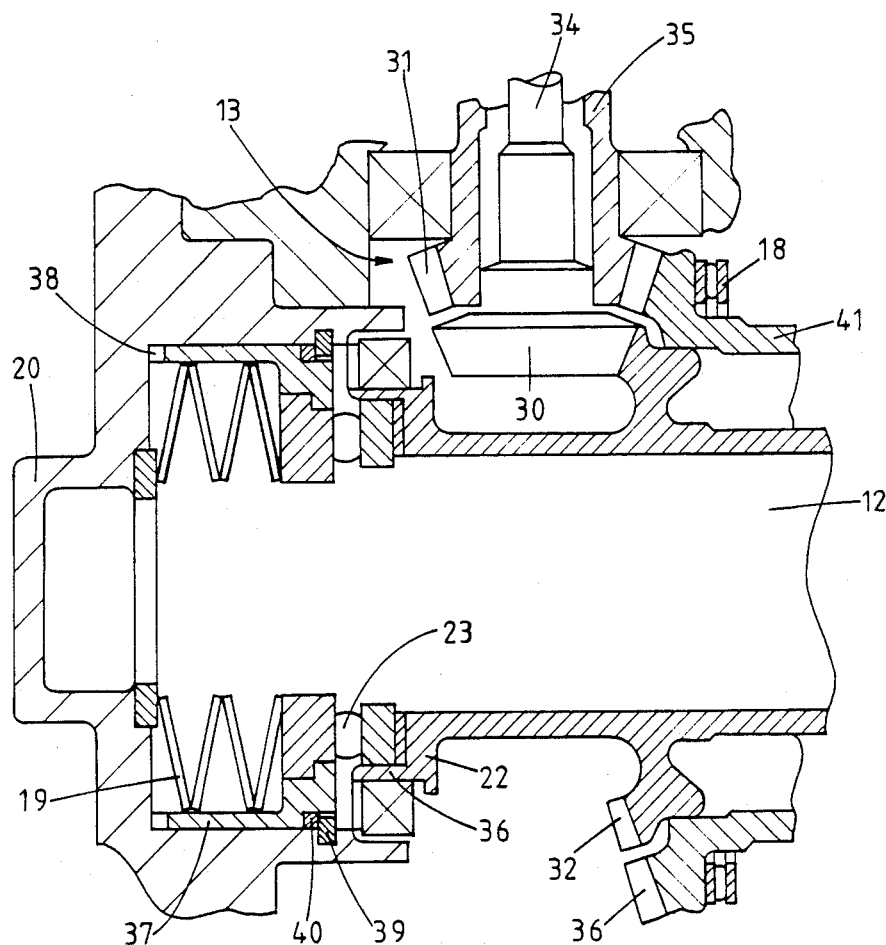

An embodiment of the invention will now be described by way of example only and with reference to the accompanying drawings in which:

FIG. 1 shows diagrammatically a transmission system for operating an air flow control surface, and FIG. 2 shows a detail, to an enlarged scale, of part of FIG. 1.

As shown in FIG. 1 an air flow control surface 10 pivotally mounted on an aircraft wing is movable by a rotary-to-linear converter 11 having a screw threaded input shaft 12 rotatable by bevel gears 13. A linearly movable output element of the converter 11 is provided by a nut 14 which is restrained against rotation. A link 15 interconnects the nut 14 and surface 11. Drive to the bevel gears 13 is provided by a hydraulic motor, (not shown) by way of a shaft 16 and a torque limiting brake device 17. The device 17 is of the type disclosed in U.S. Pat. No. 3,890,803 and is operable to prevent rotation of the shaft 16 when the torque load thereon exceeds a predetermined value.

The input shaft 12 is restrained against rightward movement, as viewed in the drawing, by thrust bearings 18 engaged by one of the bevel gears 13. A stack of spring washers 19 is axially aligned with the shaft 12 and is engaged between part of a relatively stationary housing 20 and a plate 21. A flange 22 on the shaft 12 cooperates with the plate 21 by way of a thrust bearing 23. A space between an abutment 24 on the housing 20 and an adjacent face of the flange 22 is sufficiently small as not adversely to affect the meshing of the gears 13 when the flange 22 moves into engagement with the abutment 24.

In the event that the control surface 10 jams during an attempt to move it clockwise, the nut 14 becomes stationary and the shaft 12 moves leftward to compress the spring washers 19 and bring the flange 22 into frictional engagement with the abutment 24. The increased friction torque is sensed by the device 17 which applies a brake to prevent rotation of the shaft 16. It will be apparent that the axial load on the shaft 12 at which frictional engagement between the flange 22 and abutment 24 takes place is readily adjustable by means of washers 19. It will also be apparent that the relationship between the axial load on the shaft 12 and the additional friction torque applied to the shaft 16 may be determined by the dimensions of the components of the arrangement.

FIG. 2 shows details of a practical embodiment for generating additional friction torque in response to axial load on the shaft 12. As shown in this figure the gear arrangement 13 comprises two concentric input bevel gears 30, 31 and two output bevel gears 32, 33 meshing with the respective gears 30, 31. The gears 30, 31 are on respective concentric drive shafts 34, 35 which in normal operation rotate in unison. The gear 32 is mounted on the shaft 12 and the gear 33 is mounted on a concentric outer shaft 41, the shafts 12, 41 being pinned together for rotation in unison.

The flange 22 of the shaft 12 has an axially extending portion 36. Leftward movement of the shaft 12 is opposed by the spring washers 19, acting through the thrust bearing 23. An annular element 37 is restrained against rotation by dogs 38 in the housing 20 and is restrained against axial movement by a spring washer 39 and shims 40. Leftward movement of the shaft 12 against the bias of the washers 19 causes the portion 36 to engage the element 37, imparting an additional friction torque to the shaft 12. This additional torque is also imparted to the shaft 36 and by way of the gears 13 to the shafts 34, 35 and the torque limiting device 17.

I claim:

1. An arrangement for limiting input torque to a rotary to linear motion converter which has a housing, an input shaft, an output element and means for converting rotation of said input shaft into linear motion of said output element, said arrangement comprising braking means responsive to a torque load on said input shaft for arresting rotation of said shaft when said torque load exceeds a predetermined value, said shaft being axially movable relative to said housing in response to an axial load applied to said shaft by said output element, means for biassing said shaft against axial movement by an axial load of less than a predetermined magnitude, and a friction device mounted on said housing and engageable by said shaft as a result of said axial movement, whereby at a predetermined level of said axial load the torque load on said shaft is increased beyond said predetermined value thereof and said braking means arrests rotation of said shaft.

2. An arrangement as claimed in claim 1 which includes a drive shaft, drivingly connected to said input shaft, said braking means acting upon said drive shaft.

3. An arrangement as claimed in claim 2 in which said drive shaft is connected to said input shaft through parallel drive paths which comprise first and second shafts concentric with said drive shaft and said input shaft respectively and secured thereto for rotation therewith, and respective sets of meshing gears coupling said drive and input shafts, and said first and second shafts.

* * * * *

UNITED STATES PATENT AND TRADEMARK OFFICE
CERTIFICATE OF CORRECTION

PATENT NO. : 4,864,882

DATED : September 12, 1989

INVENTOR(S) : Terence J. Capewell

It is certified that error appears in the above-identified patent and that said Letters Patent is hereby corrected as shown below: Title page:

In the Abstract, line 4, delete "increase" and substitute therefor -- increases --.

Signed and Sealed this

Seventh Day of August, 1990

*Attest:*

HARRY F. MANBECK, JR.

*Attesting Officer*   *Commissioner of Patents and Trademarks*